US012589526B2

(12) United States Patent
Shiraishi

(10) Patent No.: US 12,589,526 B2
(45) Date of Patent: Mar. 31, 2026

(54) GOLF BALL MANUFACTURING METHOD

(71) Applicant: BRIDGESTONE SPORTS CO., LTD., Tokyo (JP)

(72) Inventor: Masaki Shiraishi, Sekishi (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 85 days.

(21) Appl. No.: 18/625,503

(22) Filed: Apr. 3, 2024

(65) Prior Publication Data

US 2024/0342964 A1     Oct. 17, 2024

(30) Foreign Application Priority Data

Apr. 13, 2023     (JP) ................................. 2023-065672

(51) Int. Cl.
| | |
|---|---|
| *B29C 45/14* | (2006.01) |
| *B29C 33/56* | (2006.01) |
| *B29C 45/37* | (2006.01) |
| *B29C 45/16* | (2006.01) |
| *B29K 75/00* | (2006.01) |
| *B29K 609/00* | (2006.01) |
| *B29L 31/54* | (2006.01) |

(52) U.S. Cl.
CPC ........ *B29C 33/56* (2013.01); *B29C 45/14073* (2013.01); *B29C 45/14819* (2013.01); *B29C 45/372* (2013.01); *B29C 45/1671* (2013.01);

*B29K 2075/00* (2013.01); *B29K 2609/00* (2013.01); *B29K 2905/08* (2013.01); *B29K 2909/04* (2013.01); *B29L 2031/546* (2013.01)

(58) Field of Classification Search
CPC ............................................... B29C 45/14073
See application file for complete search history.

(56) References Cited

U.S. PATENT DOCUMENTS

2011/0070974 A1     3/2011   Omura et al.

FOREIGN PATENT DOCUMENTS

| | | | |
|---|---|---|---|
| JP | 2000-102630 A | | 4/2000 |
| JP | 2000102630 | * | 4/2000 |
| JP | 2004322347 | * | 11/2004 |
| JP | 2011-067627 A | | 4/2011 |

* cited by examiner

*Primary Examiner* — Edmund H Lee
(74) *Attorney, Agent, or Firm* — Sughrue Mion, PLLC

(57) ABSTRACT

A method for manufacturing a golf ball having a core and a cover of at least one layer includes the step of molding the cover layer with a vertically separating two-part injection mold which has a spherical cavity and three or more support pins disposed so as to be capable of advancing and retracting in a direction perpendicular to a mold parting line, each support pin being housing in a pin housing hole having a nitrided inner peripheral sidewall. This method enables a golf ball cover material to be molded using an injection mold which, because a thick plating of hard chrome does not need to be applied to the inner peripheral sidewalls of the holes housing the support pins, is inexpensive and in which the pin housing holes have a good abrasion resistance.

9 Claims, 6 Drawing Sheets

GOLF BALL MANUFACTURING METHOD

CROSS-REFERENCE TO RELATED APPLICATIONS

This non-provisional application claims priority under 35 U.S.C. § 119(a) on Patent Application No. 2023-065672 filed in Japan on Apr. 13, 2023, the entire contents of which are hereby incorporated by reference.

TECHNICAL FIELD

The present invention relates to a method for manufacturing golf balls which includes the step of molding a cover layer-forming resin material with an injection mold.

BACKGROUND ART

Injection molds are generally used when producing the cover layers of a golf ball. These injection molds commonly have a plurality of support pins, each of which is disposed so as to be capable of advancing and retracting in a direction perpendicular to the parting line of the mold. That is, when injection-molding a cover layer, the molding operation is carried out by injecting a molten resin material into the spherical cavity of the mold over a spherical insert, such as a core or an intermediate layer-encased sphere, which is supported at the interior of the mold cavity by a plurality of support pins. The support pins are disposed so as to be capable of advancing and retracting in pin housing holes which extend from an inner wall of the spherical cavity toward the outside of the mold. As the molten resin material flows into the cavity, the support pins supporting the spherical insert retract from the cavity and into the support pin holes in a self-regulating manner.

The core supported by the plurality of support pins within the mold cavity is a rubber material; the intermediate layer-encased sphere, the interior of which consists of the core, is also largely composed of a rubber material. When a strong injection pressure acts upon such a core made of a rubber material, the core undergoes a large, rugby ball-like deformation in both polar directions of the mold. As a result, the support pins, on retracting from the spherical cavity into the pin housing holes, are pressed by this core deformation directly against the inner peripheral sidewalls of the pin housing holes, especially the inner peripheral sidewalls on the outside, which has the undesirable effect of abrading the inner peripheral sidewalls of the pin housing holes. In particular, because a mold is used countless times, abrasion of the pin housing holes occurs repeatedly with each use and ends up enlarging the holes. This is a problem not only in terms of the mold itself and sometimes leads to adverse effects such as molding defects in the manufactured balls.

To deal with such abrasion of the pin housing holes, plating treatment such as hard chrome plating or electroless nickel plating has been applied to the inner peripheral sidewalls of the holes. However, even with such plating treatment, problems having to do with abrasion resistance, cost and the like remain. For example, in injection molds used to mold ionomer resin material covers, a somewhat thick hard chrome plating is applied to the inner circumferential sidewalls of the pin housing holes and so jig grinding is also carried out in order to further increase the accuracy. Unfortunately, this results in high machining costs and causes black stains to arise.

In art relating to the present invention, JP-A 2000-102630 discloses a mold treated with boron nitride, chromium nitride or titanium nitride as a means for dealing with releasability between the inside surface of the mold cavity and a golf ball core. However, this prior art makes no mention of the abrasion resistance of the pin housing holes that house support pins. Also, JP-A 2011-67627 describes the formation of a eutectoid plating of nickel and fluoropolymer in a mold for injection-molding urethane cover materials. However, even when such a eutectoid plating is formed, problems with the abrasion resistance of the pin housing holes remain to some degree.

SUMMARY OF THE INVENTION

It is therefore an object of the present invention to provide a golf ball manufacturing method that can mold a cover material by using an injection mold which, because there is no need to apply a thick plating of hard chrome or the like on the inner peripheral sidewalls of the support pin housing holes, is inexpensive and moreover in which the pin housing holes have a good abrasion resistance.

As a result of intensive investigations, I have found that by applying nitriding treatment, particularly plasma nitriding treatment, instead of plating treatment such as hard chrome plating to the inner peripheral sidewalls of the holes housing the support pins in an injection mold for molding a golf ball cover layer, when the resin material used to mold the cover layer is an ionomer resin material, or even a urethane resin material, the abrasion resistance of the pin housing holes can be well maintained. This nitriding treatment results in lower machining costs than hard chrome plating, in addition to which problems such as black staining do not arise, making such treatment industrially beneficial when using golf ball molds.

Accordingly, the present invention provides a method for manufacturing a golf ball having a core and a cover of at least one layer, which method includes the step of molding at least one layer of the cover with a vertically separating two-part injection mold, wherein the injection mold has a spherical cavity and three or more support pins disposed so as to be capable of advancing and retracting in a direction perpendicular to a parting line of the mold, each support pin being housing in a pin housing hole having an inner peripheral sidewall that is nitriding treated.

In a preferred embodiment of the manufacturing method of the invention, the nitriding treatment is plasma nitriding treatment. In this preferred embodiment, the nitrided inner peripheral sidewall of each pin housing hole may have formed thereon a layer structure which includes a 5 to 20 μm thick nitrided diffusion layer and does not include a compound layer. The plasma nitriding treatment may be followed by plating treatment. The plating treatment may be composite plating in which fluoropolymer particles are dispersed in a nickel-based matrix.

In another preferred embodiment of the invention, the injection mold, following nitriding treatment, is machined on an inner surface of the spherical cavity to form raised and recessed features corresponding to dimples.

In yet another preferred embodiment, the cover layer molded with the injection mold is an outermost layer of the cover. The outermost layer may have a thickness of from 0.2 to 1.5 mm and may be composed primarily of a polyurethane resin. The outermost layer may have a material hardness on the Shore D hardness scale of from 30 to 55.

Advantageous Effects of the Invention

The inventive method for manufacturing golf balls, which includes the step of molding a resin material for a golf ball cover layer with an injection mold, enables the cover material to be molded using an injection mold which, because a thick plating of hard chrome does not need to be applied to the inner peripheral sidewalls of the holes housing the support pins, is inexpensive and in which the pin housing holes have a good abrasion resistance.

DETAILED DESCRIPTION OF THE INVENTION

The objects, features and advantages of the invention will become more apparent from the following detailed description taken in conjunction with the appended diagrams.

The manufacturing method of the invention is a method for manufacturing golf balls having a core and a core of at least one layer, which method includes the step of molding at least one layer of the cover with a vertically separating two-part injection mold.

The cover material is not particularly limited. Various types of thermoplastic resins used in golf ball cover stock may be used for this purpose. The use of a resin material composed primarily of an ionomer resin or a urethane resin is particularly suitable. The cover resin material is heated to a predetermined temperature and, in a molten state, is injected between a spherical insert such as a core or an intermediate layer-encased sphere that has been set within the injection mold and the walls of a spherical cavity within the mold, thereby molding a cover over the spherical insert.

The cover has a material hardness on the Shore D hardness scale which, although not particularly limited, is preferably 30 or more, more preferably 35 or more, and even more preferably 40 or more. The upper limit is preferably not more than 70, more preferably not more than 62, and even more preferably not more than 55. The cover has a thickness which is preferably 0.2 mm or more, more preferably 0.5 mm or more, and even more preferably 0.7 mm or more. The upper limit is preferably not more than 2.0 mm, more preferably not more than 1.8 mm, and even more preferably not more than 1.5 mm.

Figure 1A:
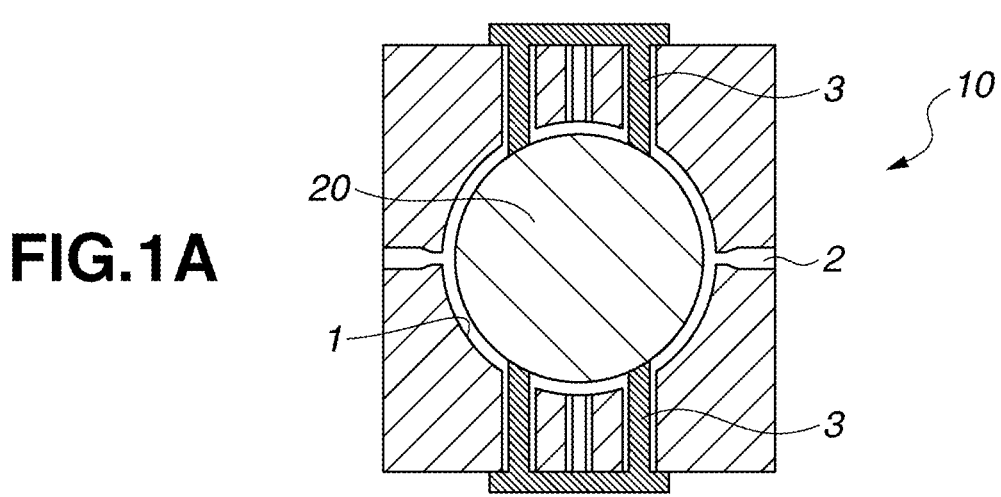
FIG. 1 shows schematic views of the injection mold used in the invention, FIG. 1A depicting the mold prior to injection molding, FIG. 1B depicting the mold as it is being filled with a resin material, and FIG. 1C depicting the mold after it has been filled with the resin material.
Figure 1B:
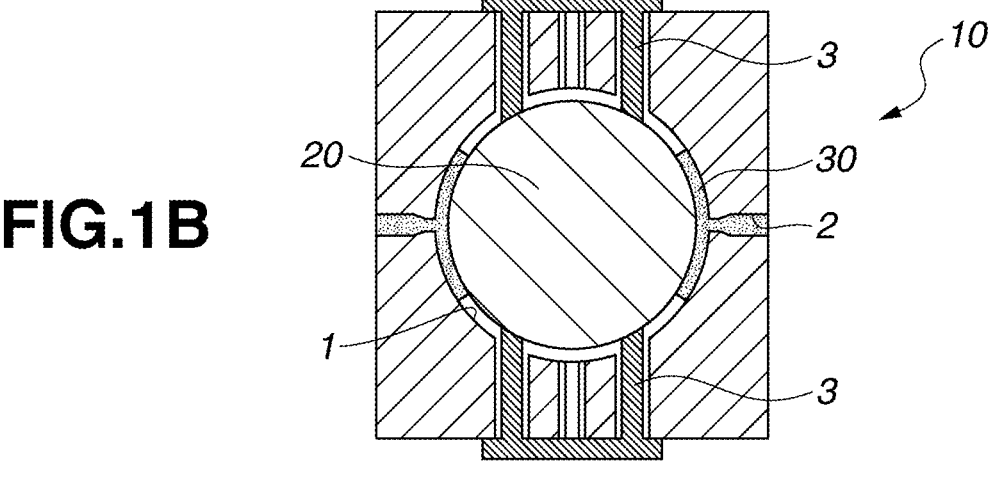
Figure 1C:
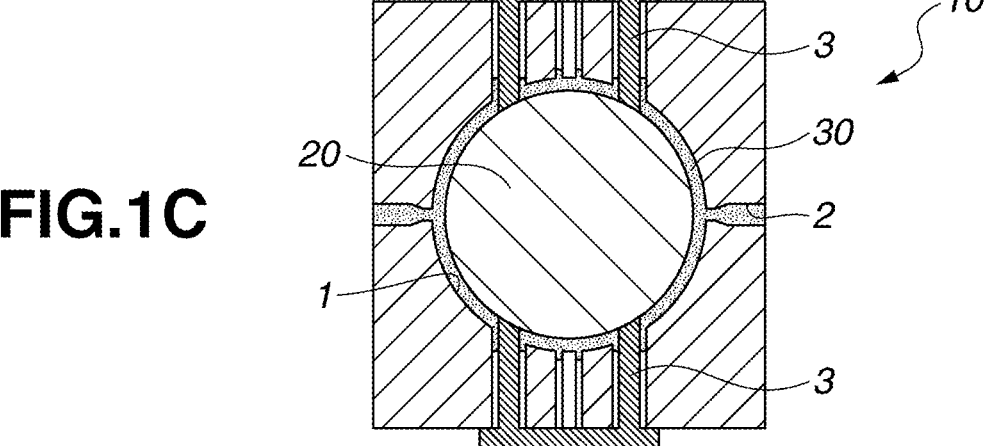

The injection mold used in this invention (sometimes referred to below simply as the "mold") typically has a spherical cavity, a plurality of gates for introducing the cover-forming resin material into the spherical cavity, and a plurality of support pins disposed so as to be capable of advancing and retracting in a direction perpendicular to a mold parting line. In one embodiment of the invention, as shown in FIG. 1, using an injection mold 10 having a spherical cavity 1, a given number of gates 2 and a given number of support pins 3, a molten resin material 30 serving as the cover material is made to flow from the gates 2 and into the spherical cavity 1, inside of which a spherical insert 20 such as a core or an intermediate layer-encased sphere is supported by a plurality of support pins 3. FIG. 1A is a schematic diagram showing the interior of the mold prior to injection molding; this shows the spherical insert 20 being supported by support pins 3. FIG. 1B is a schematic diagram of the interior of the mold 10 as the molten resin material 30 is being introduced into the mold 10, and FIG. 1C is a schematic diagram showing the mold 10 when the molten resin material 30 has filled the interior of the mold 10 and injection molding is complete. The given number of support pins 3 which support the spherical insert 20 within the spherical cavity 1 gradually retract as the molten resin material 30 fills the interior of the spherical cavity 1, each support pin 3 retreating so as to become flush with the wall of the cavity just before filling of the molten resin material 30 into the cavity 1 is fully complete, after which filling of the molten resin material 30 is completed. Although not shown in the diagrams, runners for feeding the cover material are arranged at the position of the mold parting line in such a way as to encircle the spherical cavity, and gates that open out radially toward the cavity from the runners are circumferentially disposed as described below.

Figure 2:
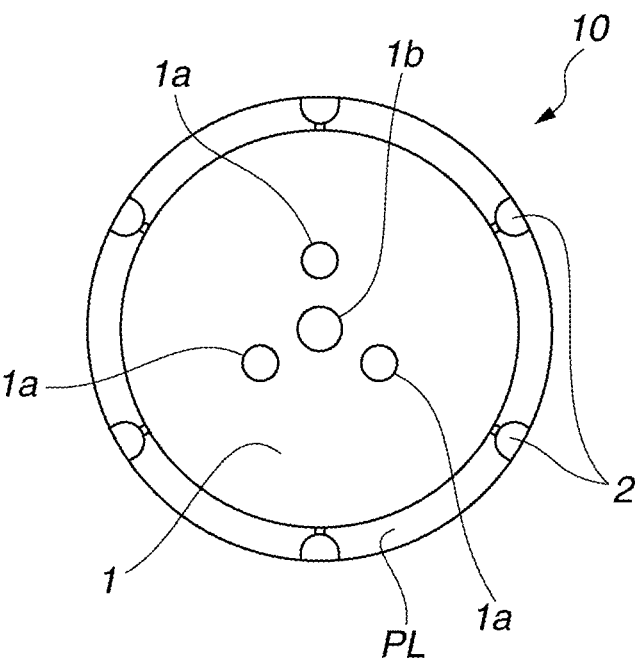
FIG. 2 is a schematic view showing the arrangement of gates within the injection mold.

A plurality of gates are formed along the mold parting line. In the embodiment shown in FIG. 2, six gates 2 are evenly arranged along the parting line PL. When the number of gates is too small, the molten resin material does not spread well throughout the spherical cavity. As a result, after injection molding, the cover ends up being thinner near the poles of the spherical cavity and may even be unable to completely cover the spherical insert—be this a core or an intermediate layer-encased sphere, leaving it in a partially uncovered state. In order to have the molten resin material spread uniformly within the spherical cavity so as to form the thin cover layer desired, it is preferable to arrange the gates 2 circumferentially at equal intervals along the parting line L.

The plurality of support pins 3 disposed so as to be capable of advancing and retracting in a direction perpendicular to the mold parting line PL are typically three or more support pins arranged at given intervals (such as three pins at 120° intervals) along a circle centered on the poles of the spherical cavity. These support pins are disposed so as to be capable of advancing and retracting within holes of circular cross-section in the top and bottom mold halves. As shown in FIG. 1A, when the support pins 3 have advanced into the spherical cavity 1, they hold the spherical insert 20 in place; once the molten resin material fills the interior of the spherical cavity 1, the support pins 3 retreat to the position of the inner wall of the spherical cavity 1. It is desirable to optimize the number and diameter of the support pin housing holes (diameter of the support pin ends) in order to minimize deformation of the intermediate layer-encased sphere that has been set within the spherical cavity and stably position the core at the center of the spherical cavity while the cavity is being filled with the resin material.

The mold has preferably at least three support pins, more preferably at least four support pins, and even more preferably at least six support pins, in the upper mold half or the lower mold half. The upper limit to this number is preferably 12 or less, and more preferably 10 or less. Outside of this range in the number of support pins, it may be difficult to minimize deformation of the spherical insert and form the cover resin material to a uniform thickness throughout the space between the spherical insert and the spherical cavity wall while holding the spherical insert at the center of the spherical cavity.

Figure 3:
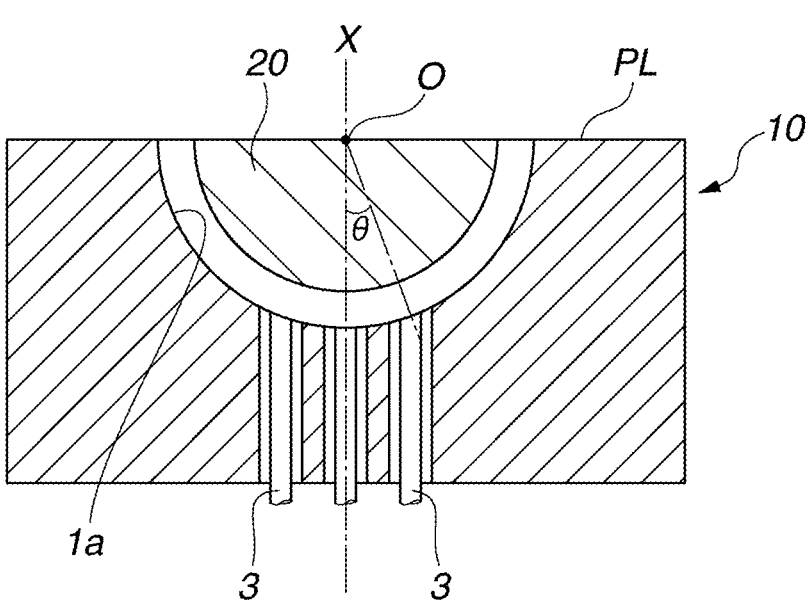
FIG. 3 is a schematic cross-sectional view showing the positions of support pins disposed in the injection mold.

With regard to the positions at which the support pins are disposed, referring to FIG. 3, it is desirable for each support pin 3 to be disposed in such a way that the angle θ of intersection between an axis X connecting the top and bottom poles of the mold and a normal directed from a center O on the axis X and toward the cavity wall 1a where the support pin retracts is from 15 to 30°. This angle θ is more preferably at least 18°, and even more preferably at least 20°. The upper limit is more preferably 28° or less, and even more preferably 25° or less. Outside of this range in the angle, it may be difficult to minimize deformation of the spherical insert 20 and form the cover resin material to a uniform thickness between the spherical insert 20 and the cavity wall 1a while holding the spherical insert 20 at the center O of the cavity.

Figure 4:
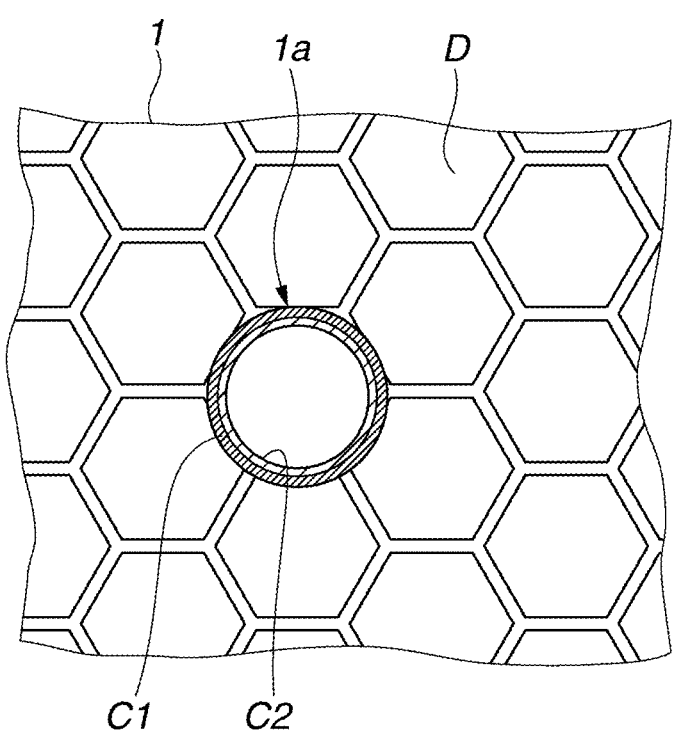
FIG. 4 is an enlarged view of a portion of the spherical mold cavity showing a pin housing hole and its vicinity.

The mold used in this invention is characterized in that the inner peripheral sidewalls of the pin holes housing the support pins are nitriding treated. FIG. 4 is an enlarged view of a pin housing hole and its vicinity at the interior of the mold spherical cavity 1. As shown in this diagram, a nitrided layer C1 has been formed by nitriding treatment on the inner peripheral sidewall of the pin housing hole 1a which houses a support pin. FIG. 4 additionally shows a plating film C2 which covers the surface of the nitrided layer C1. This plating film C2 will be described later in the Specification.

"Nitriding treatment" generally refers to a treatment technique which heats a steel product, causing nitrogen atoms to diffuse and penetrate to the interior and hardening the surface. Specific examples include gas nitriding, salt bath nitriding, gas soft nitriding, ion nitriding (plasma nitriding), vacuum nitriding and activated powder nitriding. Such nitriding treatment is generally expected to increase abrasion resistance, fatigue resistance, corrosion resistance and heat resistance, although in this invention it is used primarily for the purpose of improving abrasion resistance. Of these processes, plasma nitriding does not require an external heating device because the material being treated is heated by the collision energy of ions. Moreover, this treatment process utilizes radicals, nitrogen atoms and ions in an active plasma state and so has a low energy consumption or gas consumption and a short treatment time, is cost-effective, and has minimal impact on the environment. Also, because plasma nitriding (ion nitriding) provides a high degree of freedom in selecting the optimal nitriding conditions according to the material and intended use of the manufactured article and can achieve hardening without oxidation, use in the present invention is desirable.

Also, in the plasma nitriding process, to activate the sample surface prior to treatment, a passivation film is removed by sputtering via particle-ion collisions to the sample surface with a hydrogen or argon plasma, enabling even types of steel that have a high chromium content to be nitrided. The part to be treated is then heated to the nitriding temperature by plasma energy. In the nitriding process, the type and thickness of the desired compound layer can be determined from such conditions as the treatment temperature and treatment time. After nitriding treatment, plating treatment is sometimes impossible due to the precipitation of smut ingredients and the influence of the compound layer. However, there also exist, among plasma nitriding techniques, treatments that result in a low treated surface roughness and are not prone to the formation of a compound layer;

such treatments enable plating treatment to be easily carried out. In light of the above, it is desirable to use plasma nitriding in this invention.

The material (base material) of the mold body is not particularly limited, so long as it is a plateable metal. For example, a mold formed of a conventional metallic material such as carbon steel, beryllium-copper alloy, stainless steel or copper may be used. Of these, the use of prehardened steel which has been heat treated beforehand is preferred. Because prehardened steel has an excellent machinability and also does not need to be heat-treated afterwards, complex dimple shapes can be precisely created.

A composite plating film is formed in the spherical cavity of the mold so as to cover the surface of the cavity. The composite plating film is not particularly limited, although one in which fluoropolymer particles are dispersed in a nickel-based matrix is especially preferred.

The nickel-based matrix is not particularly limited, so long as it is composed primarily of nickel. For example, alloys of nickel with another metal or substance, such as nickel-phosphorus alloys, nickel-copper-phosphorus alloys, nickel-boron alloys, cobalt-nickel alloys and nickel-molybdenum-phosphorus alloys, may be used.

Polytetrafluoroethylene (PTFE) particles, tetrafluoroethylene-perfluoroalkyl vinyl ether copolymer (PFA) particles, tetrafluoroethylene-hexafluoropropylene copolymer (FEP) particles, tetrafluoroethylene-ethylene copolymer (ETFE) particles or the like may be used as the fluoropolymer particles dispersed in the nickel-based matrix. Of these, PTFE particles and FEP particles are especially preferred. The size of the fluoropolymer particles, although not particularly limited, is preferably 0.05 μm or more, and more preferably 0.5 μm or more. The size of the fluoropolymer particles is preferably not more than 3 μm, and more preferably not more than 2 μm.

The composite plating film of fluoropolymer particles dispersed in a nickel-based matrix can be formed by, for example, a method which disperses fluoropolymer particles in a nickel-based matrix plating solution and, while stirring the solution, carries out plating on the surface of the base material. The plating process used may be, for example, an electroplating process or an electroless plating process. However, the use of an electroless plating process is preferred because a particularly uniform film can be obtained.

The thickness of the composite plating film is not particularly limited. However, because this composite plating film can be very thinly formed and because, even when thin, sufficient durability, releasability with respect to resin materials such as urethane materials and wettability are exhibited, the thickness is preferably 20 μm or less, and more preferably 10 μm or less. On the other hand, the lower limit in the thickness of the composite plating film is preferably 1 μm or more, and more preferably 2 μm or more.

The amount of fluoropolymer particles included in the composite plating film, although not particularly limited, is preferably 5 vol % or more, and more preferably 25 vol % or more. On the other hand, to obtain a composite plating film 20 of sufficient strength, the amount of fluoropolymer particles 22 is preferably not more than 50 vol %, and more preferably not more than 40 vol %.

An example of the above-described composite plating film of fluoropolymer particles dispersed in a nickel-based matrix is the product available from Ulvac Techno, Ltd. under the trade name "Nifgrip."

The mold having a nitrided layer formed on the inner peripheral sidewalls of the pin housing holes that is used in this invention is suitably fabricated by the process described below.

Figure 5:
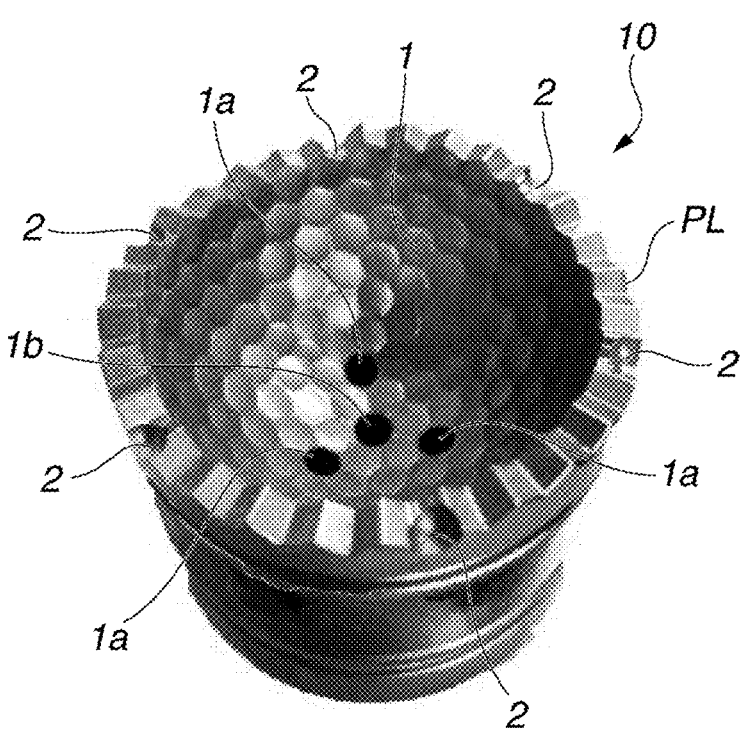
FIG. 5 is a photograph showing the body of the injection mold.
Figure 6A:
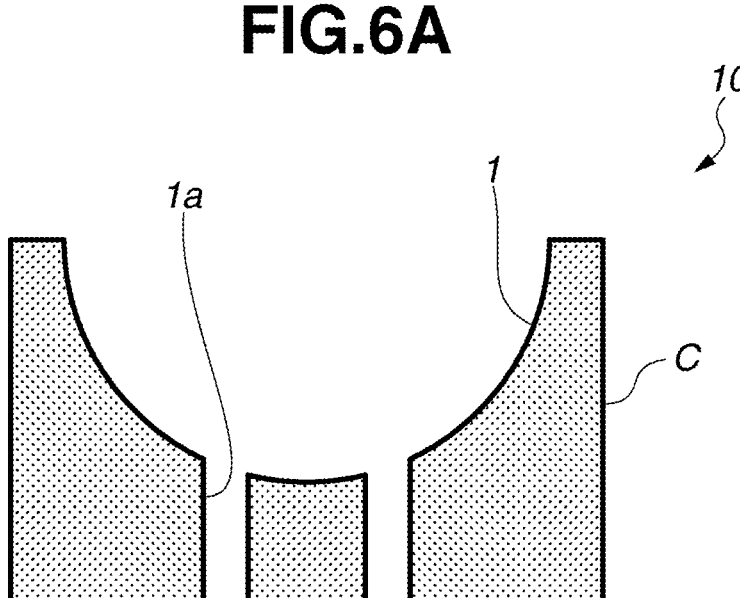
FIG. 6A is a schematic view showing the mold with all surfaces nitrided.
Figure 6B:
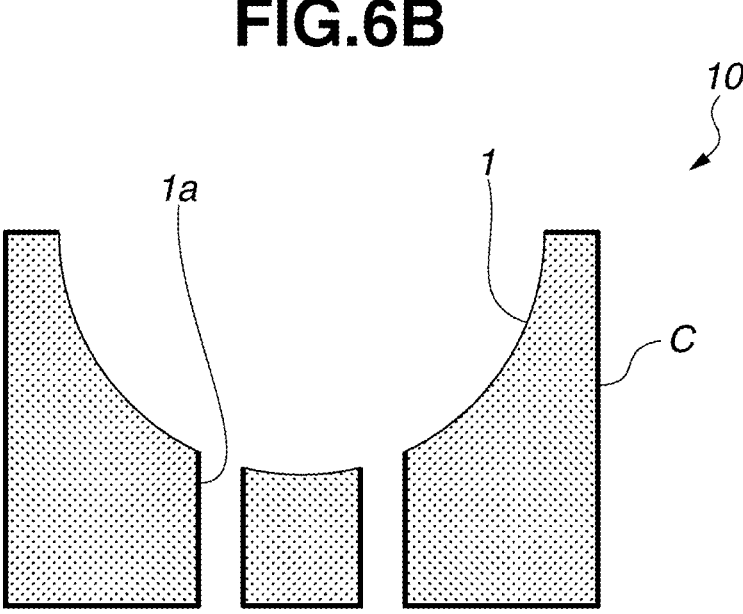
FIG. 6B is a schematic view showing the mold with the nitrided layer within the spherical cavity removed by machining.

First, referring to the photograph in FIG. 5, one side (the upper half or lower half) 10 of a mold body having pin housing holes 1a and a vent pin 1b is provided. Then, as shown in FIG. 6A, the entire surface of the mold 10 is subjected to nitriding treatment such as plasma nitriding, thereby forming a nitrided layer. In the diagram, the thick black lines indicate the nitrided layer C. Next, as shown in FIG. 6B, dimples are machined within the spherical cavity 1 of the mold body. Although nitriding treatment is basically a process with little dimensional variation, it appears that even greater accuracy can be achieved by carrying out the machining of precisely designed dimples after nitriding treatment. The nitrided layer that formed in the spherical cavity 1 of the mold body is ultimately removed by dimple machining and completely disappears. Moreover, as shown in FIG. 6B, after dimple machining, by carrying out the above-described plating treatment on the entire surface of the mold 10, the durability of the mold due to rust inhibition and the mold release properties can be enhanced. At this time, plating treatment also can be more favorably carried out on a surface without a nitrided layer.

EXAMPLES

The following Examples and Comparative Examples are provided to illustrate the invention, and are not intended to limit the scope thereof.

Example 1 and Comparative Example 1

In Example 1 and Comparative Example 1, a 41.1 mm diameter intermediate layer-encased sphere prepared in advance by covering a core—the core being a molded and vulcanized rubber composition composed primarily of polybutadiene rubber—with an ionomer resin was set in respective injection molds for Example 1 and Comparative Example 1, and a cover-forming resin material (Shore D hardness, 43) composed primarily of polyurethane was injection-molded over the intermediate layer-encased sphere to a thickness of 0.8 mm. This operation was repeatedly carried out and the number of repeated uses (number of injection cycles) after which abrasion arose was determined. Specifically, the number of times that problem-free molding could be carried out without the peripheral sidewalls of the support pin housing holes (particularly the outside portions thereof) being pressed against and widened by the support pins was determined.

The mold used in Example 1, as shown in FIG. 5, was obtained by furnishing a mold body that had not yet been surface-treated, carrying out plasma nitriding treatment (no compound layer/20 μm nitrided layer), and subsequently machining dimples in the mold body, in the process completely removing the nitrided layer on the inner surface of the cavity. Last of all, a specific plating treatment (having the trade name "Nifgrip") was carried out over the entire mold.

The mold used in Comparative Example 1, as shown in FIG. 5, was obtained by furnishing a mold body that had not yet been surface-treated, machining dimples in the mold body, and subsequently carrying out a specific plating treatment over the entire mold.

The specific plating treatment used here is available under the tradename "Nifgrip" from Ulvac Techno, Ltd. Electroless nickel and fluoropolymer are co-deposited in a plating solution, with the fluoropolymer being uniformly included to a volumetric ratio of 30% in the film formed on the mold. Following film formation, heat treatment is carried out, causing the electroless nickel and the fluoropolymer to firmly bond to each other. With the use of this plating treatment, a good mold releasability is obtained.

As a result, although releasability from the mold during cover molding was good in both Example 1 and Comparative Example 1, the mold in Comparative Example 1 had a wear resistance such that the repeated number of uses was about 340,000 times. By contrast, the mold in Example 1 had a wear resistance such that the repeated number of uses was about 570,000 times. Hence, the mold in Example 1 had a far better wear resistance.

Example 2 and Comparative Example 2

In Example 2 and Comparative Example 2, a 40.0 mm diameter core which is a molded and vulcanized rubber composition composed primarily of polybutadiene rubber was set in respective injection molds for Example 2 and Comparative Example 2, and a cover-forming resin material (Shore D hardness, 62) composed primarily of an ionomer resin was injection-molded over the core to a thickness of 1.35 mm. This operation was repeatedly carried out and, as in Example 1, the number of times that problem-free molding could be carried out without the peripheral sidewalls of the support pin housing holes (particularly in the outside portions thereof) being pressed against and widened by the support pins was determined.

The mold used in Example 2, as shown in FIG. 5, was obtained by furnishing a mold body that had not yet been surface-treated, carrying out plasma nitriding treatment (no compound layer/20 μm nitrided layer), subsequently machining dimples in the mold body, in the process completely removing the nitrided layer on the inner surface of the cavity. Last of all, a specific plating treatment was carried out over the entire mold. This was the same plating treatment as in Example 1.

The mold used in Comparative Example 2, as shown in FIG. 5, was obtained by furnishing a mold body that had not yet been surface-treated, machining dimples in the mold body, and subsequently carrying out a somewhat thick plating treatment on the inner peripheral sidewalls of the pin housing holes. This thick plating treatment was a plating treatment with hard chrome that is carried out in the prior art; the plating thickness was 20 μm. Next, because plating thickness variability readily arises in hard chromium plating depending on the shape of the object being plated, there is a need to perform jig grinding so as to ensure the precision of the pin housing holes (jig grinding refers to a machining technique which, while maintaining the pitch accuracy, can grind the inside diameter of round holes and the dimensions of square holes and irregular shapes at those positions in 1 μm increments). Last of all, plating treatment was carried out over the entire mold. This was the same plating treatment as in Example 2 above.

As a result, releasability from the mold during cover molding was good in both Example 2 and Comparative Example 2. Even after use through 1 million injection cycles, there was substantially no difference in abrasion resistance between the molds in Example 2 and Comparative Example 2; both had good abrasion resistances. However, in Comparative Example 2, the machining costs were high owing to the use of hard chrome plating. Also, when a new mold was used, the pins and thickly plated areas rubbed against each other, forming black stains due to metal powder, which often caused defectives to arise. In Example 2, the amount of time and cost entailed in plating the mold were greatly reduced compared with Comparative Example 2. Moreover, no black stains arose.

Japanese Patent Application No. 2023-065672 is incorporated herein by reference. Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for manufacturing a golf ball having a core and a cover of at least one layer, which method comprises the step of: molding at least one layer of the cover with a vertically separating two-part injection mold, wherein the injection mold has a spherical cavity and three or more support pins disposed so as to be capable of advancing and retracting in a direction perpendicular to a parting line of the mold, each support pin being housed in a pin housing hole having an inner peripheral sidewall that is made by a nitriding treatment.

2. The manufacturing method of claim 1, wherein the nitriding treatment is plasma nitriding treatment.

3. The manufacturing method of claim 2, wherein the nitrided inner peripheral sidewall of each pin housing hole has formed thereon a layer structure which includes a 5 $\mu$m to 20 $\mu$m thick nitrided diffusion layer and does not include a compound layer.

4. The manufacturing method of claim 1, wherein the injection mold, following nitriding treatment, is machined on an inner surface of the spherical cavity to form raised and recessed features corresponding to dimples.

5. The manufacturing method of claim 2, wherein the plasma nitriding treatment is followed by plating treatment.

6. The manufacturing method of claim 5, wherein the plating treatment is composite plating in which fluoropolymer particles are dispersed in a nickel-based matrix.

7. The manufacturing method of claim 1, wherein the cover layer molded with the injection mold is an outermost layer of the cover.

8. The manufacturing method of claim 7, wherein the outermost layer has a thickness of from 0.2 mm to 1.5 mm and is composed primarily of a polyurethane resin.

9. The manufacturing method of claim 7, wherein the outermost layer has a material hardness on the Shore D hardness scale of from 30 to 55.

* * * * *